United States Patent [19]
Dodge et al.

[11] Patent Number: 5,988,739
[45] Date of Patent: Nov. 23, 1999

[54] ANATOMICALLY CORRECT BICYCLE SEAT

[76] Inventors: John R. Dodge, 425 S. Hubbard Lane - Apt. 353, Louisville, Ky. 40207; John P. Dodge, 1507 Brixham Ave., McHenry, Ill. 60050

[21] Appl. No.: 08/993,669

[22] Filed: Dec. 18, 1997

[51] Int. Cl.$^6$ ....................................................... B60N 2/38
[52] U.S. Cl. ......................... 297/195.1; 297/209; 297/214
[58] Field of Search ................................. 297/195.1, 209, 297/211, 214, 452.23, 452.25

[56] References Cited

U.S. PATENT DOCUMENTS

| | | | |
|---|---|---|---|
| 576,310 | 2/1897 | Henderson | 297/214 |
| 619,179 | 2/1899 | Hunt | 297/209 |
| 654,720 | 7/1900 | Englebert | 297/214 |
| 1,157,512 | 10/1915 | Deem | 297/209 |
| 3,249,384 | 5/1966 | Timms | 297/209 |
| 4,765,617 | 8/1988 | Groves . | |
| 5,011,222 | 4/1991 | Yates et al. . | |
| 5,387,025 | 2/1995 | Denisar . | |
| 5,502,851 | 4/1996 | Costello . | |
| 5,507,476 | 4/1996 | Lin | 297/209 X |
| 5,720,518 | 2/1998 | Harrison | 297/214 |

FOREIGN PATENT DOCUMENTS

| | | | |
|---|---|---|---|
| 141949 | 11/1948 | Australia | 297/209 |
| 0 467 541 A1 | 1/1992 | European Pat. Off. . | |

*Primary Examiner*—Peter M. Cuomo
*Assistant Examiner*—Stephen Vu
*Attorney, Agent, or Firm*—Mathew R. P. Perrone, Jr.

[57] ABSTRACT

An anatomically correct bicycle seat, which includes a platform to receive the buttocks of a bicycle rider and a support mechanism for the platform in order to permit the anatomically correct seat to be mounted on a bicycle, relieves on blood vessels of a bicycle rider.

12 Claims, 4 Drawing Sheets

ANATOMICALLY CORRECT BICYCLE SEAT

This invention relates to a bicycle seat, and more specifically to a bicycle seat having minimized effect on the groin and genitalia of a bicycle rider.

BACKGROUND OF THE INVENTION

Traditional bicycle seats are saddle-shaped and put all of the cyclist's weight on the pubic tubercle and ischiopubic ramus of the pelvis. The recent literature cites increasing reports by cyclists, amateurs and professionals alike, who suffer adverse effects therefrom. Typical adverse experiences, caused by pressure induced by the currently designed saddle-shaped bicycle seat resulting in blunt trauma to the perineal and pelvic structures, suffered include the following symptoms: groin numbness or paresthesia, penile numbness or paresthesia, immediate impotence, delayed impotence, inability to ejaculate or experience orgasm, or the possible correlation with an elevated prostate specific antigen score.

The horn of the saddle designed seat fits directly against the before mentioned pelvic structures. This results in occlusion of arteries and veins supplying blood flow to the penis, as well as, compression of local nerves as they are sandwiched between the horn of the bicycle seat and the bony structures of the anterior pelvis. The resultant outcome is a numbing effect or paresthesia, as reported by many cyclists, that can result in sustained paresthesia of the groin and penis, delayed or immediate impotence, and perhaps even an elevated prostate specific antigen.

Many scientific studies are known to have considered this problem. One study by K. V. Andersen and G. Bovim, entitled "Impotence and Nerve Entrapment in Long Distance Amateur Cyclist" published in *Acta Neuro Scandinavia* in 1997 provides the results of questioning 160 male Norwegian bicyclists following a 540 kilometer bicycle touring race for symptoms of peripheral nerve compression after long distance cycling.

The gist of the article is that (1) twenty two (22%) percent of the responding males reported symptoms from the innervation areas of the pudendal or cavernous nerves. Thirty-three males had penile numbness or paresthesia; (2) ten of those had numbness that lasted for more than one week; and (3) impotence was reported by 21 or thirteen (13%) percent of the males which lasted more than one week in eleven subjects and for more than one month in three subjects. They concluded that the frequency of impotence and penile numbness may be higher than indicated and the symptoms may last for as long as eight months following blunt trauma to the peripheral nerves.

B. D. Weiss in the "Nontraumatic Injuries in Amateur Long Distance Bicyclists", which appeared in the *American Journal of Sports Medicine* of Mar. 13, 1985, at pages 187 to 192, reports the questioning 132 participants in a 500 mile 8-day bicycle tour to determine the frequency and severity of nontraumatic injuries experienced by riders. The cyclists rode an average of 95.8 miles per week on a routine basis. Following the race, they found the most nontraumatic injury to be buttock pain experienced by 32.8% of the riders. Groin numbness and paresthesia occurred in approximately 10% of the participants.

F. J. Levine, A. J. Greenfield, and I. Goldstein in their article "Arteriographically Determined Occlusive Disease Within the Hypogastric-Cavernous Bed in Impotent Patients Following Blunt Perineal and Pelvic Trauma", which appeared in the *Journal of Urology* 1990; Volume 144, Number (5) at Pages 1147–1153; reported on the presence, location, and pattern of arterial occlusive disease within the hypogastric-cavernous arterial bed in impotent men following blunt perineal and pelvic trauma. They reviewed internal pudendal arteriogram of 20 patients with a history of blunt perineal trauma and seven with blunt pelvic trauma, who immediately developed of impotence. Arteriographic studies of 104 other impotent patients were reviewed for a comparison.

Patients who had suffered blunt pelvic and perineal trauma had significantly different patters of arteriographically demonstrated occlusive disease within the distal hypogastric-cavernous arterial bed consistent with the site of traumatic injury. Those who sustained blunt pelvic trauma and had immediate impotence revealed arterial occlusive lesions mainly in the internal pudendal, common penile, cavernous, and dorsal arteries. Those who sustained blunt penile trauma and complained of immediate impotence demonstrated a more focal pattern of pathological arterial occlusion primarily in the cavernous and dorsal arteries. Those with blunt perineal trauma demonstrated a significantly higher incident of solitary arterial lesions in the cavernous artery without proximal disease than those with blunt pelvic trauma, 48% and 8%, respectively.

They hypothesized that blunt trauma without immediate impotence may be a potential risk factor for the late development of arterial vasculogenic impotence, and that unrecognized or seemingly innocuous trauma may be a factor in cases of idiopathic impotence. Patient without trauma and vascular factors have more diffuse patterns of arteriographically demonstrated arterial lesions.

L. A. Mathews, T. E. Herberner, and A. D. Seftel, in their article, "Impotence Associated with Blunt Pelvic and Perineal Trauma; Penile Revascularization as a Treatment Option", which appeared in the papers of the *Seminar on Urology* in 1995, Chapter 13 Volume 1, Pages 66–72; also recognized erectile dysfunction or impotence as a well-known complication from blunt pelvic and perineal trauma. The mechanism of injury is usually related to the trauma itself through the shearing of the penile vasculature in the pelvis or by direct trauma to the vasculature in the perineum.

R. M. Munarriz, Q. R. Yan, A. Znehra, D. Udelson, and I. Goldstein in their article, "Blunt Trauma: The Pathophysiology of Hemodynamic Injury Leading to Erectile Dysfunction" which appeared in the *Journal of Urology* of 1995 Volume 153, Number 6 at Pages 1831–1840, reported on blunt trauma as it relates to the pathophysiology of the hemodynamic injury leading to erectile dysfunction. Out of 131 men studied, corporeal veno-occlusive dysfunction was identified in 62% of the cases and cavernous artery insufficiency in 70%. Patients with pelvic trauma had significantly more abnormal sites of venous drainage and more sever degrees to which venous structures filled with contrast media when observe with arteriography. Pharmaco-arteriography revealed the site specific arterial occlusive lesions that were consistent with the site of impact.

Traumatic vasculogenic impotence is hypothesized to be the result of direct injury to the proximal corpora and its arterial inflow bed. Traumatic veno-occlusive dysfunction is theorized to be the consequence of focal intracavernous wound repair and permanent focal alterations in erectile tissue compliance. They reported that traumatic vasculogenic impotence afflicts and estimated 600,000 American men of whom 250,000 have sports-related injuries.

A. Rana and G. D. Chisholm, in their article "He Sold His Bike for a Low Prostate Specific Antigen", which appeared in the *Journal of Urology* 1994, Volume 151, Number 3 at Page 700, describe an individual who holds his bicycle seat on an exercise bicycle responsible for an elevated prostate specific antigen (PSA). The 80 year old patient quit exercising on that seat, resulting in a drop from a clinical stage T3 adenocarcinoma of the prostate and a PSA of 3,244 milligrams per milliliter at the time of diagnosis. The patient usually rides his exercise bicycle every morning for 1 to 2 miles. On the presumption that the activity is causing the marked increase in his PSA, he was instructed to decrease his exercise.

With the decreased use of his exercise bicycle, and no treatment for his adenocarcinoma, his PSA consistently decreased. After 24 months, the patient ceased all bicycle riding and his PSA was decreased to 5.9 milligrams per milliliter. The riding of his exercise bicycle with the standard miniaturized saddle exerts a direct pressure on the perineum and prostate. They reported that the high PSA levels were consistent with the massaging action of the bicycle seat on the prostatic tumor.

H. R. Safford, D. E. Craford, S. H. Mackenzie, and M. Capriola, in their article, "The Effect of Bicycle Riding on Serum Prostate Specific Antigen Levels", which appeared in the *Journal of Urology* 1996, Volume 156, Number 7 at Pages 103 to 105, reported on the effect of bicycle riding on serum prostate specific antigen levels. They obtained baseline PSA levels from 260 volunteers before completing a 250 mile bicycle race. After the 4 day race, PSA was remeasured and the level was compared to the pre-race levels. They found no statistically or clinically significant elevation in the PSA after bicycle riding. However, those with an initially elevated PSA had an increase after bicycle riding, although the change did not represent the population. More research is needed on this topic.

Most recently Dr. Irvin Goldstein, a leading Urologist and pioneer in the surgical treatment of impotence at the Boston Medical Center, was featured on the Sep. 18, 1997 edition of 20/20 entitled *Men, Biking, and Impotence*. One of his conclusions is that numbness in the groin may be the first warning sign of impending impotence or the inability to have an erection. Another part of his data shows that six out 100 men in his practice can trace back the cause of impotence to bicycling. The theory behind this is that all of the person's weight is supported by the artery to the penis and has confirmed this by finding artery blockage in the exact position where the bicycle seat fits a mans crotch. Dr. Goldstein has determined that just 11% of a man's weight can cause compression of the penile arteries as they press on the bicycle seat. The injury is typically bilateral as the pressure from the ischiopubic ramus of the pelvis compresses the penile arteries against the bicycle seat.

The penile arteries normally bounce back from episodes of compression but with repeated and extended injury they could cause permanent damage to the vessel walls leading to blockage of blood flow resulting in impotence. According to Dr. Goldstein, this repeated trauma causes hardening and flattening of the arteries much like that caused by hypertension and cigarette smoking. This repeated insult to the vessels over time can lead to delayed impotence. He reported that 52% of men in the United States are impotent. He estimates that there are approximately 100,000 men that have become impotent from damage inflicted by bicycle seats. He boldly stated that he would not ride a bicycle with its seat in the present design form.

Thus it proper to conclude that there is a major problem with bicycle seat design. This problem requires an effective solution.

SUMMARY OF THE INVENTION

Among the many objectives of this invention is the provision of a bicycle seat adapted to protect the genital area of a rider.

A further objective of this invention is to provide an anatomically correct seat to assist in the positioning of a rider on the bicycle.

A still further objective of this invention is to provide an anatomically correct seat to provide comfort for a rider.

Yet a further objective of this invention is to provide an anatomically correct seat to avoid arterial pressure on a rider.

Also an objective of this invention is to provide an anatomically correct seat with strong seat support.

Another objective of this invention is to provide an anatomically correct seat for use on a bicycle.

Yet another objective of this invention is to provide an anatomically correct seat for relieving pressure on the bone structure.

Still another objective of this invention is to provide an anatomically correct seat to provide comfort for a rider.

These and other objectives of the invention (which other objectives, become clear by consideration of the specification, claims and drawings as a whole) are met by providing an anatomically correct bicycle seat, which includes a platform to receive the buttocks of a bicycle rider and a support mechanism for the platform in order to permit the anatomically correct seat to be mounted on a bicycle.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
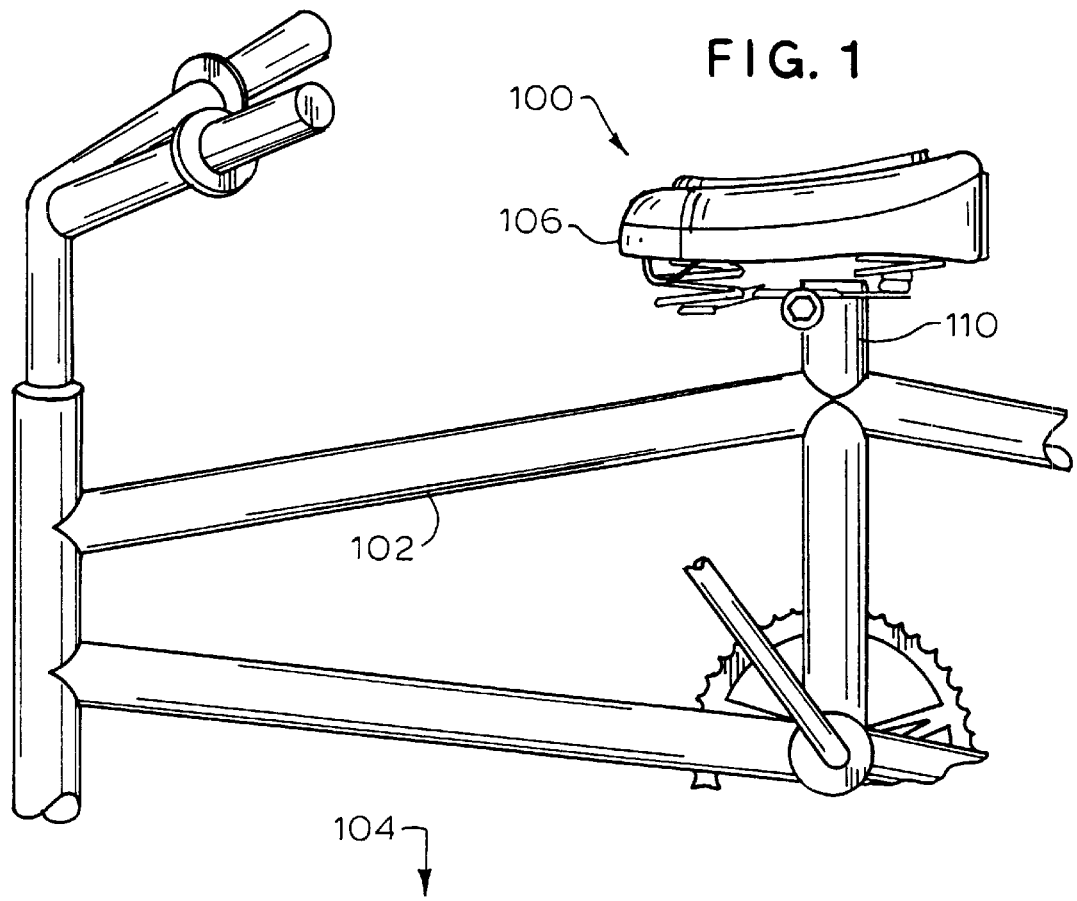
FIG. 1 depicts a side view of the anatomically correct seat 100 of this invention, as applied to a bicycle 102.
Figure 2:
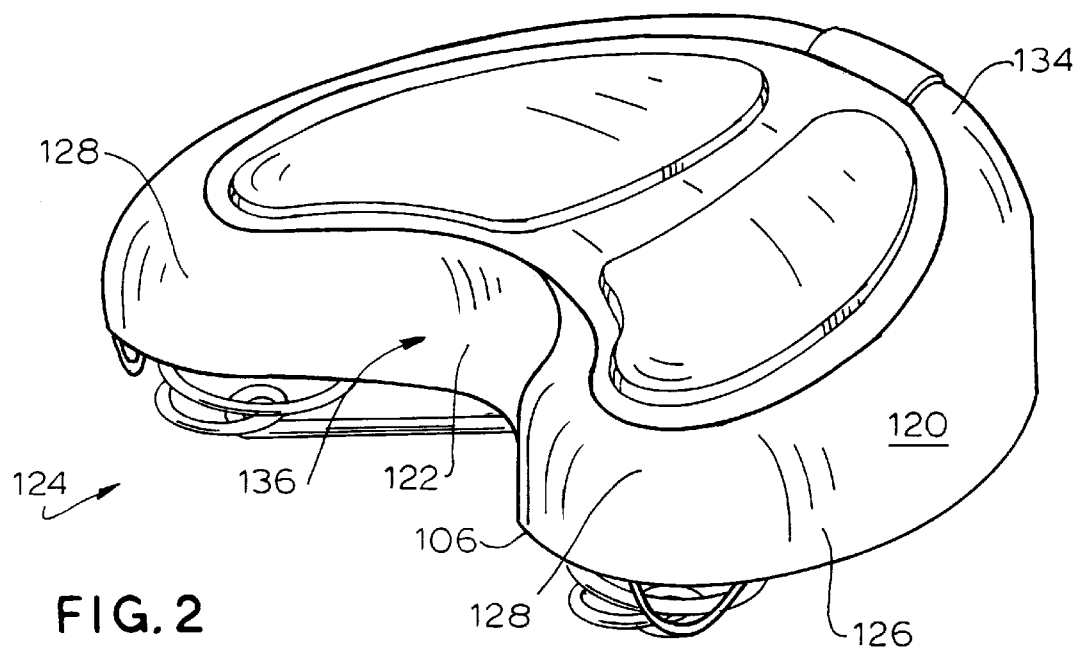
FIG. 2 depicts a top perspective view of the anatomically correct seat 100 of this invention.

In view of the recent scientific evidence and other experience with paresthesia following bicycle riding, an anatomically correct bicycle seat supports the bicycle rider and greatly minimizes pressure on the genital area of a human bicycle rider of either gender. For a male, this anatomically correct bicycle seat greatly minimizes or even completely eliminates an impotence problem. The anatomically correct bicycle seat of this invention also allows the cyclist to ride more comfortably.

Therefore, the anatomically correct bicycle seat is designed to eliminate the etiologic feature of the conventional bicycle seat that causes repeated sustained blunt trauma to the perineal and pelvic structures. This eliminated feature is the horn of the conventional saddle-shaped bicycle seat.

The anatomically correct bicycle seat includes a U-shaped member, having incorporated therein an open design in the middle thereof to relieve all pressure on the blood vessels and nerves in the groin area. This revolutionary new seat allows the cyclist's weight to be positioned both laterally and posteriorly onto the ischial tuberosity of the pelvis in order to redistribute the cyclist's weight much like a normal seat. Therefore, the cyclist's weight is more evenly distributed over the structures that are able to support the pressure instead of over the fragile tissues of the anterior pelvis.

This seat will benefit the millions of people who ride conventional and stationary bicycles by allowing the user to have a more secure seat that does not put pressure on the groin region, yet still permitting for a full range of motion for the cyclist to exercise effectively. Moreover, obese individuals will have an even greater benefit as they will have the confidence to ride free from pain and numbness in the groin.

The bicycle seat can eliminate this most unfortunate and serious sequelae from such anatomically damaging seats. The anatomically correct bicycle seat allows the bicyclist to have all of the benefits of bicycle exercise without experiencing numbness of the groin and penis, or delayed or immediate impotence caused by vascular occlusion and nerve compression experienced with the conventional saddle-shaped bicycle seat.

Not only does this seat include a U-shaped member, the forward part or the front flat edge of the U-shaped member can be inwardly arced. Because this front inward arc is at the legs of a rider, pressure is greatly reduced on blood vessels and nerve structure. This inward arcing helps accommodate sides of the bicycle rider and provide for a more efficient seat. In this fashion, the desired results can be obtained and the comfort of the seat can be greatly increased for at the same time permitting appropriate power to be applied to the pedals of the bicycle by the rider.

This new design for an anatomically correct bicycle seat eliminates the described flaws of the prior art bicycle seat. The anatomically correct bicycle seat allows the user to ride a bicycle more comfortably and securely. The U-shaped bicycle seat of this invention is specifically designed to eliminate pressure to the anatomical structures associated with the groin or anterior pelvis. More specifically, this anatomically correct bicycle seat eliminates pressure from the pubic bone.

The pressure points are moved to a more posterior position and lateral to the ischial tuberosity of the pelvis. This allows for the redistribution of weight from compressing the vessels and nerves of the anterior pelvic region to the large muscles and more substantial areas of the pelvis conducive to weight bearing.

The arc of the U-shaped seat faces the rear of the bicycle. The substantially flat, top edge part of the U-shaped seat may include a pair of arcs in the edge thereof, in order to minimize pressure on the cyclist's body is preferred.

On top of the seat may be a pair of slight protrusions. These protrusions assist the positioning of the buttocks of a bicycle rider, while minimizing the undesired pressure on nerves or blood vessels.

A series of rods positioned under the seat and around the bicycle post provide appropriate strength and support for the seat. This series of rods are spaced beneath, and around and within the outer edge of the seat from the center mounting. Various patterns are suitable for support use.

Preferably there are four springs on the seat. The springs are mounted on the underside of the seat. Bolts protrude from the underside of the seat. Each bolt preferably forms the corner of an isosceles trapezoid. A spring fits over each bolt. A section of a rod assembly fits on the bolt, thereby trapping the spring in a supporting fashion against the underside of the seat thanks to the present of a nut.

No matter what the shape of the rod assembly, a length of the rod assembly is clamped to center post of the bicycle, due to a shaped extension of members of the rod assembly extending from the bolt to the center post. The rod assembly relationship to the springs provides support and stability for the seat.

Figure 4:
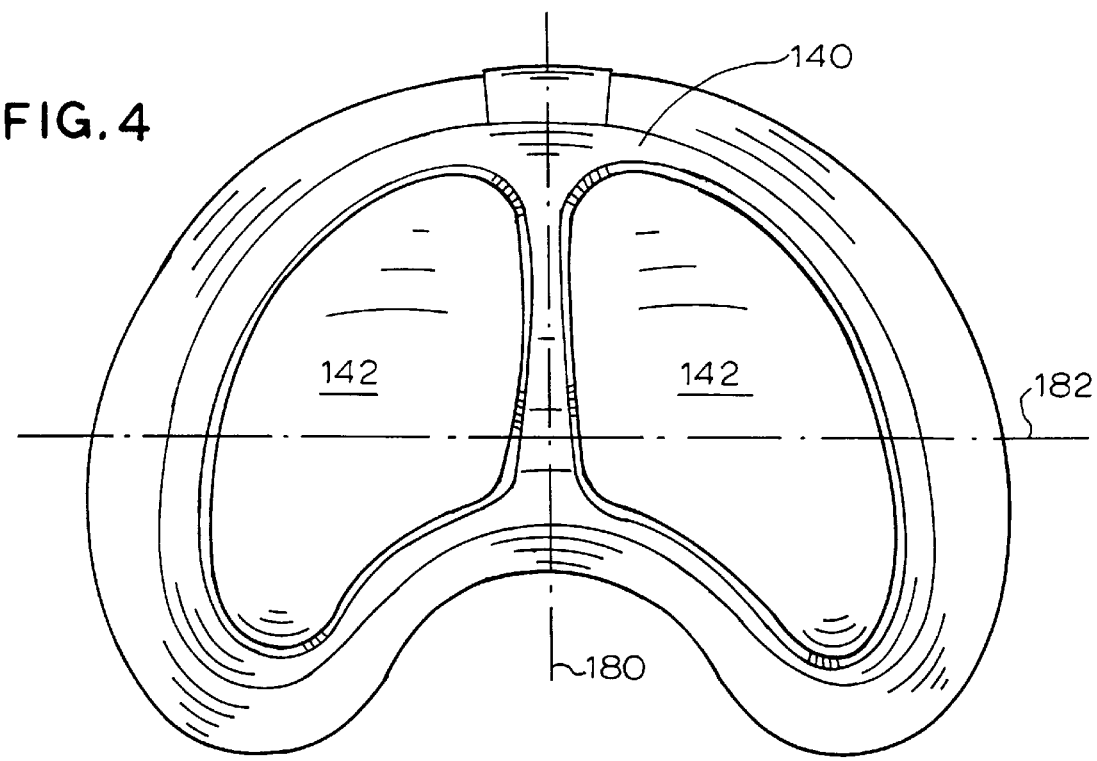
FIG. 4 depicts a top plan view of the anatomically correct seat 100 of this invention.
Figure 5:
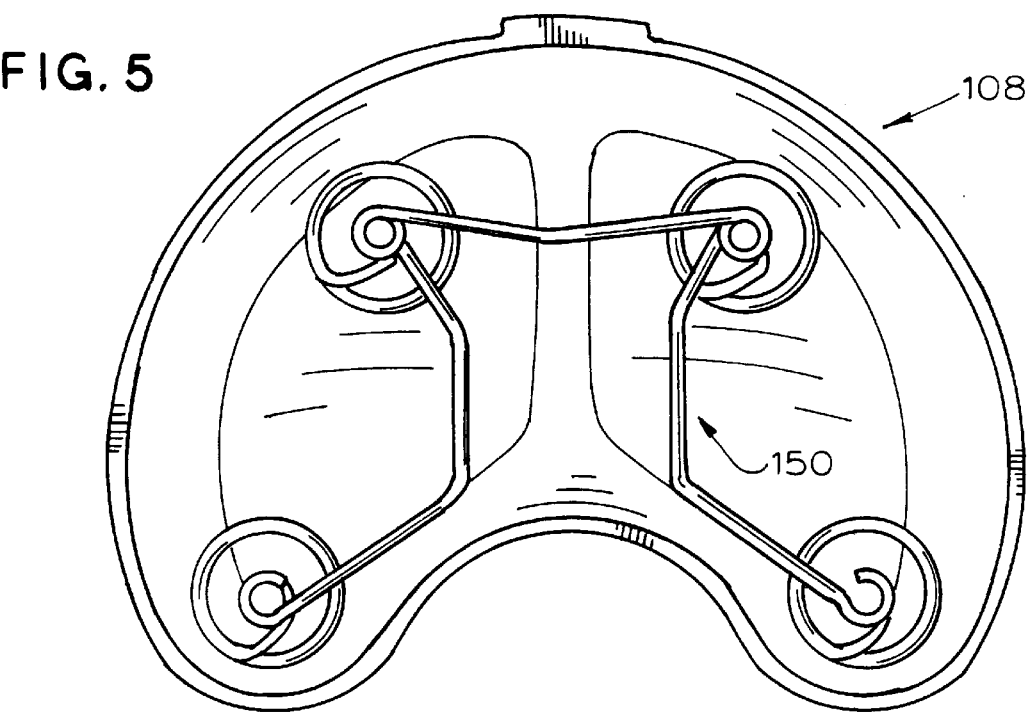
FIG. 5 depicts a bottom plan view of the anatomically correct seat 100 of this invention.

Referring now to FIG. 1, anatomically correct bicycle seat 100 is shown as positioned on bicycle 102. The anatomically correct bicycle seat 100, from a top view 104 (FIG. 4) has a U-shaped member 120, which incorporates an open design in the front middle portion 122 in the form of an inward arc to relieve all pressure from the seat 100 on the vessels and nerves in the groin area of the cyclist.

Adding FIG. 2, FIG. 3, FIG. 4 and FIG. 5 to the consideration, the bicycle seat 100 has a forward part 124 leading to outer edge 126 for the U-shaped member 120 in the form of two outward arcs surrounding the front middle portion 122. In each outward arc of forward part 124 is an inward arc 128 to relieve pressure on the legs of a cyclist. Each inward arc 128 reduces pressure at the top of the rider's thigh.

The anatomically correct bicycle seat 100 allows the user to ride the bicycle 102 more comfortably and securely. The U-shaped bicycle seat 100 of this invention is specifically designed to eliminate pressure to the anatomical structures, especially those in the pubic area.

The U-shaped member 120 may be of any size and is related to the size of the cyclist. The top proportions of the U-shaped member 120 are adjusted as desired. A large-sized version of seat 100 may have a vertical axis 170 of 20 to 30 centimeters and a horizontal axis 180 of 40 to 50 centimeters. A medium-sized version of seat 100 may have a vertical axis 180 of 15 to 20 centimeters and a horizontal axis 182 of 20 to 30 centimeters. A small-sized version of seat 100 may have a vertical axis 180 of 10 to 15 centimeters and a horizontal axis 182 of 15 to 20 centimeters.

The rear exterior arc 134 of the U-shaped seat 100 faces the rear 104 of the bicycle 102. The front interior arc 136 of the U-shaped seat 100 faces the front 106 of the bicycle 102. The substantially top edge part of the U-shaped seat 100 adjacent to front interior arc 136 may include symmetrical inward arcs 128 in the edge thereof, in order to minimize pressure on the cyclist's body and specifically on the leg in a preferred manner.

From top view 104, on top receiving surface 140 of the seat 100 may be a pair of slight protrusions 142. These protrusions 142 assist the positioning of the buttocks, while minimizing or eliminating the undesired pressure. Such protrusions 142 may be up to one centimeter in height and have three outer arcs with one inner arc.

Figure 3:
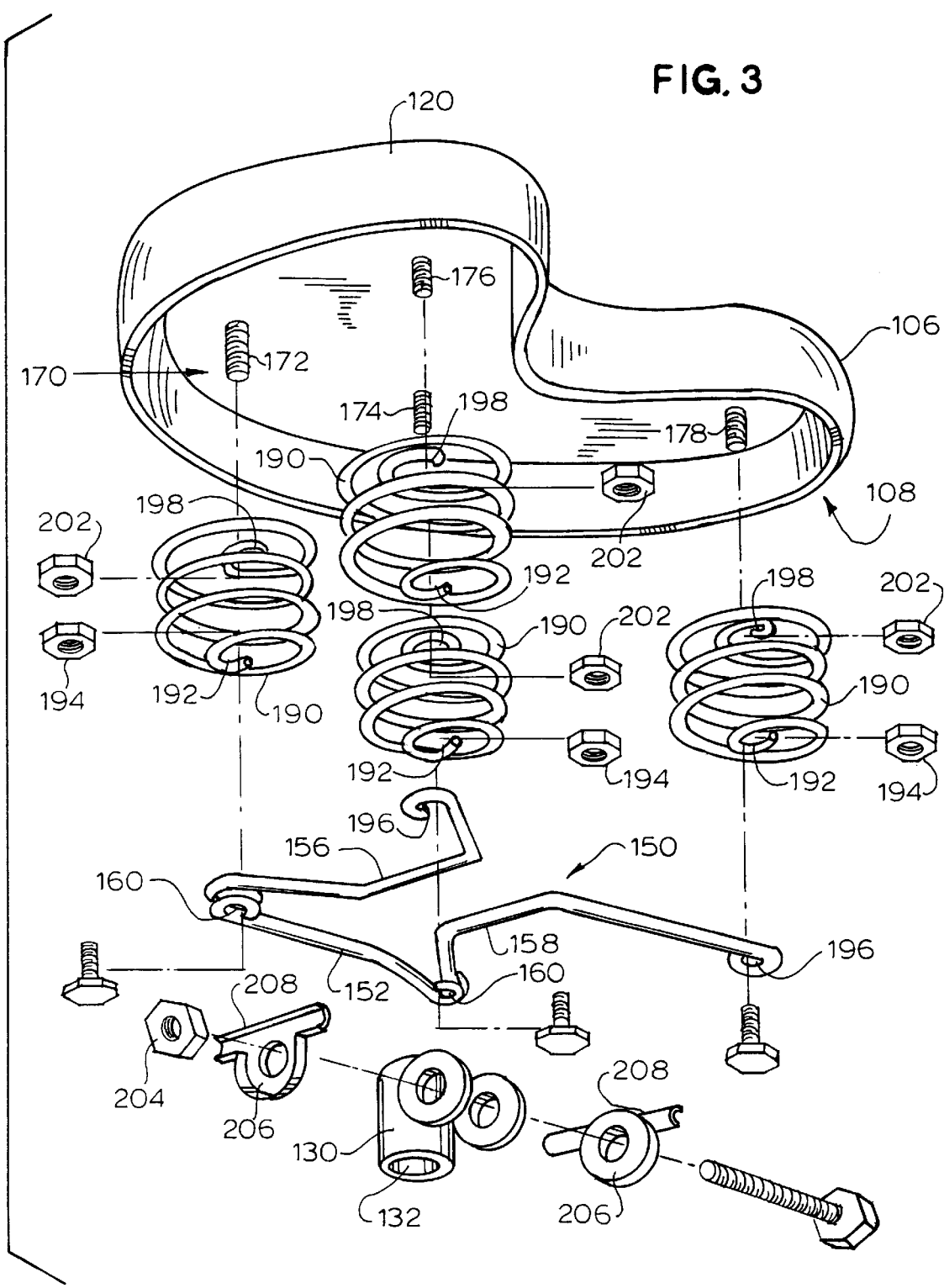
FIG. 3 depicts a bottom, exploded perspective view of the anatomically correct seat 100 of this invention.

Referring specifically to FIG. 3, a open-ended, rod assembly 150, positioned under the seat 100 and specifically the U-shaped member 120, and around the bicycle seat post 110, provides appropriate strength and support for the seat 100. Three members in open-ended, rod assembly 150 are preferred, while four members may be necessary for a heavy duty support. The rod assembly 150 runs around the outer edge 126 of the seat 100, when seen from bottom view 108.

In FIG. 3, the bottom view 108 of U-shaped member 120 includes a series of four of a mounting post assembly 170 secured thereto. Mounting post assembly 170 has a first threaded member 172 and second threaded member 174, which preferably combined to form the bottom vertices of the longer base of an isosceles trapezoid. The third threaded member 176 and fourth threaded member 178 combine to form the top vertices and the upper base of an isosceles trapezoid.

On each of the mounting post assembly 170 may be fitted a spring 190 of a standard type for a bicycle seat. This spring 190 has a seat loop 198, which is portioned on a member of mounting post assembly 170, such as fourth threaded member 178. Seat nut 202 is threaded onto fourth threaded member 178, thereby holding spring 190 in place with seat loop 198.

Lower spring loop 192 cooperates with a first nut and bolt assembly 194. The spring 190 then receives rod member of mounting post assembly 170 at the outside loop 196. The spring 190 then receives rod member of mounting post assembly 170 at the outside loop 196.

Rod assembly 150, as shown in FIG. 3, includes an aperture bend 198, which can receive a member of the mounting post assembly 170 secured thereon by a spring nut 202. As any of first threaded member 172, second threaded member 174, third threaded member 176 and fourth threaded member 178 pass through aperture bend 198, rod nut and bolt assembly 194 secures the rod assembly 150 thereon and over spring 190, at lower spring loop 192.

Open-ended, rod assembly 150 has a generally squared U-shape with a base 152 adjacent to rear exterior arc 134 of the U-shaped seat 100. At each end base 152 is a bolt aperture 154 formed by a coiling of rod assembly 150. One bolt aperture 154 receives either one of third threaded member 176 or fourth threaded member 178. The other bolt aperture 154 receives the remaining member of that pair.

From one bolt aperture 154 extends first arm 156 of rod assembly 150. From the other bolt aperture 154 extends second arm 158 of rod assembly 150. Both first arm 156 and second arm 158 end in rod loop 160. Each rod loop 160 respectively receives one of first threaded member 174 and second threaded member 176.

Substantially centered in the seat 100 is a center mounting post receiver 130. Bicycle seat post 110 receives post aperture 132 of center mounting post receiver 130, which is clamped thereon in a standard fashion. Thus bicycle seat post 110 can can have seat 100 secured thereby by a modification of a standard bicycle seat nut assembly 204 which uses washer 206, thereby securing the seat 100 to the bicycle 102. The rod assembly 150 and the springs 190 combine to make the seat 100 flexible and relieve the desired pressure on the areas of the body.

Washer 206 includes an upper rod arm receiver 208. There is washer 206 with an upper rod arm receiver 208. If one of upper rod arm 208 is adapted to receive first arm 156, it occurs while oppositely disposed rod arm 208 receives second arm 158. This clamping mechanism secures the seat 100 to the bicycle 102. Center mounting post receiver 130 of seat 100 receives bicycle seat post 110 (FIG. 1) and thereby mounts seat 100 on bicycle 102. Such structure adds to the strength of the seat 100.

Figure 6:
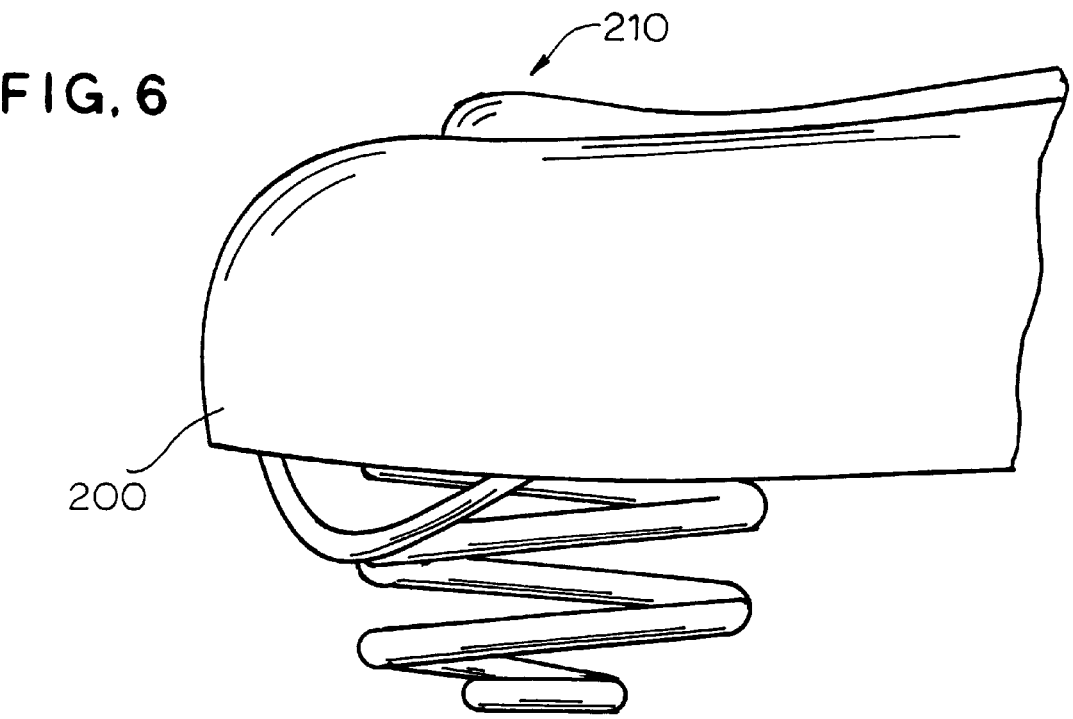
FIG. 6 depicts a side view of the anatomically correct seat 100 with front arc modification 200 of this invention.

In FIG. 6, anatomically correct seat 100 has a front arc modification 200. On the U-shaped member 120, adjacent to the front interior arc 136, the front arc modification 200 is shown. Each portion of the U-shaped member 120 adjacent to front interior arc 136 has an increased downward slope 210. This slope 210 minimizes rear thigh contact for a rider.

Figure 7:
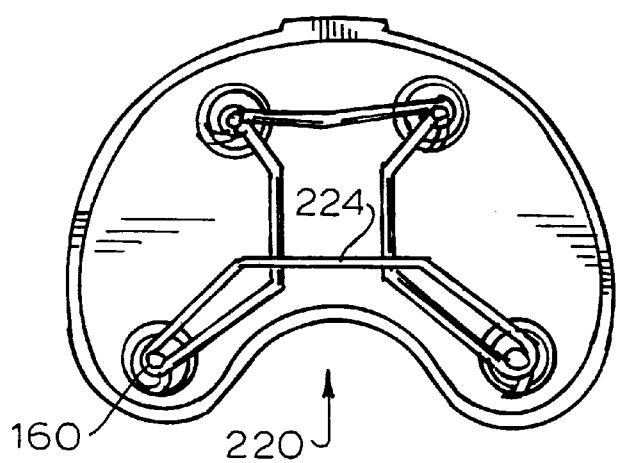
FIG. 7 depicts a bottom plan view of the anatomically correct seat 100 of this invention, with a square rod assembly 220.

In FIG. 7, a modified version of U-shaped rod assembly 150 is depicted. Square rod assembly 220 adds additional support to the area around front interior arc 136. Extension piece 224 joins each rod loop 160. It is the extension piece 224, which completes square rod assembly 220 and provides additional front support for anatomically correct seat 100.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. An anatomically correct bicycle seat having a platform to receive buttocks of a bicycle rider and a support mechanism for the platform in order to permit the anatomically correct seat to be mounted on a bicycle comprising:

(a) the platform including a U-shaped member;
 (b) the U-shaped member having incorporated therein an open design adapted to relieve pressure;
 (c) the U-shaped member having a front edge and a rear outward arc;
 (d) an inward arc being situated in the front edge and being adapted for orientation toward a front of the bicycle;
 (e) the platform including a top surface and a bottom surface;
 (f) the support mechanism being mounted on the bottom surface;
 (g) the top surface being adapted to receive the buttocks;
 (h) a pair of protrusions being adapted to assist positioning of the buttocks of a bicycle rider, while minimizing undesired pressure on nerves or blood vessels;
 (i) the support mechanism including a rod assembly and a spring assembly; and
 (j) the rod assembly cooperating with the spring assembly;
 (k) the support mechanism including a bolt assembly;
 (l) the bolt assembly being adapted to support the rod assembly and the spring assembly; and
 (m) a nut assembly being adapted to cooperate with the bolt assembly and support the rod assembly and the spring assembly; and
 (n) the rod assembly being adapted to mount the anatomically correct bicycle seat on the bicycle;
 (o) the bolt assembly including a first bolt, a second bolt, a third bolt and a fourth bolt;
 (p) the first bolt, the second bolt, the third bolt and the fourth bolt combining to form the vertices of an isosceles trapezoid;
 (q) the first bolt receiving a first spring;
 (r) the second bolt receiving a second spring;
 (s) the third bolt receiving a third spring;
 (t) the fourth bolt receiving a fourth spring; and
 (u) the first bolt, the second bolt, the third bolt and the fourth bolt combining to receive the rod assembly.

2. The anatomically correct bicycle seat of claim 1 further comprising:

9

(a) the rod assembly including a one piece metal rod;

(b) the one piece metal rod being adapted to cooperate with the first bolt, the second bolt, the third bolt and the fourth bolt;

(c) the first bolt and the second bolt forming a longer base of the isosceles trapezoid; and (d) the third bolt and the fourth bolt forming a shorter base of the isosceles trapezoid.

3. The anatomically correct bicycle seat of claim 2 further comprising:

(a) the one piece metal rod extending from the first spring to the third spring to the fourth spring to the second spring;

(b) the first bolt and the second bolt being adjacent to the front edge;

(c) the third bolt and the fourth bolt being adjacent to the rear outward arc; and (d) the one piece metal rod having a first arcuate loop adapted to fit over the first bolt;

(e) the one piece metal rod having a second arcuate loop adapted for securing to the second spring;

(f) the one piece metal rod having a third circular loop adapted for securing to the third spring; and (g) the one piece metal rod having a fourth circular loop adapted for securing to the forth spring.

4. The anatomically correct bicycle seat of claim 3 further comprising:

(a) the spring assembly including a first spring, a second spring, a third spring and a fourth spring;

(b) the first spring being secured at one end to the first bolt;

(c) the second spring being secured at one end to the second bolt;

(d) the third spring being secured at one end to the third bolt;

(e) the fourth spring being secured at one end to the fourth bolt; and (f) the spring assembly being positioned between the rod assembly and the platform.

5. The anatomically correct bicycle seat of claim 4 further comprising:

(a) the rod assembly being secured to a center post of the bicycle in order to mount the anatomically correct bicycle seat on the bicycle;

(b) the rod assembly being adapted to extend from the bolt assembly to the center post;

(c) the rod assembly cooperating with the spring assembly in order to provide support and stability for the anatomically correct bicycle seat.

6. A support mechanism for an anatomically correct seat comprising:

(a) the support mechanism including a rod assembly and a spring assembly;

(b) the rod assembly cooperating with the spring assembly;

(c) the support mechanism including a bolt assembly and a nut assembly;

(d) the bolt assembly being adapted to support the rod assembly and the spring assembly;

(e) the nut assembly cooperating with the bolt assembly in order to support the rod assembly and the spring assembly;

(f) the rod assembly being adapted to mount the anatomically correct bicycle seat on the bicycle;

10

(g) the bolt assembly including a first bolt, a second bolt, a third bolt and a fourth bolt;

(h) the first bolt, the second bolt, the third bolt and the fourth bolt combining to form the vertices of an isosceles trapezoid;

(i) the first bolt receiving a first spring;

(j) the second bolt receiving a second spring;

(k) the third bolt receiving a third spring;

(l) the fourth bolt receiving a fourth spring; and (m) the first bolt, the second bolt, the third bolt and the fourth bolt combining to receive the rod assembly.

7. The support mechanism of claim 6 further comprising:

(a) the rod assembly including a one piece metal rod;

(b) the one piece metal rod being adapted to fit on the first bolt, the second bolt, the third bolt and the fourth bolt;

(c) the first bolt and the second bolt forming a longer base of the isosceles trapezoid; and (d) the third bolt and the fourth bolt forming a shorter base of the isosceles trapezoid.

8. The support mechanism of claim 7 further comprising:

(a) the one piece metal rod extending from the first bolt to the third bolt to the fourth bolt to the second bolt;

(b) the first bolt and the second bolt being adjacent to the front edge;

(c) the third bolt and the fourth bolt being adjacent to the rear outward arc; and (d) the one piece metal rod having a first arcuate loop adapted to fit over the first bolt;

(e) the one piece metal rod having a second arcuate loop adapted to fit over the second bolt;

(f) the one piece metal rod having a third circular loop adapted to fit over the third bolt; and (g) the one piece metal rod having a fourth circular loop adapted to fit over the fourth bolt.

9. The support mechanism of claim 8 further comprising:

(a) the spring assembly including a first spring, a second spring, a third spring and a fourth spring;

(b) the first bolt receiving the first spring;

(c) the second bolt receiving the second spring;

(d) the third bolt receiving the third spring;

(e) the fourth bolt receiving the fourth spring; and;

(f) the spring assembly being positioned between the rod assembly and the platform.

10. The support mechanism of claim 8 further comprising:

(a) the rod assembly being secured to a center post of the bicycle in order to mount the anatomically correct bicycle seat on the bicycle;

(b) the rod assembly being adapted to extend from the bolt assembly to the center post;

(c) the rod assembly cooperating with the spring assembly in order to provide support and stability for the anatomically correct bicycle seat.

11. The support mechanism of claim 7 further comprising:

(a) the one piece metal rod being continuous;

(b) the one piece metal rod extending continuously from the first bolt to the third bolt to the fourth bolt to the second bolt to the first bolt;

(c) the first bolt and the second bolt being adjacent to a front edge of the anatomically correct seat;

(c) the third bolt and the fourth bolt being adjacent to a rear outward arc of the anatomically correct seat;

(d) the one piece metal rod having a first circular loop adapted to fit over the first bolt;

(e) the one piece metal rod having a second circular loop adapted to fit over the second bolt;

(f) the one piece metal rod having a third circular loop adapted to fit over the third bolt; and (g) the one piece metal rod having a fourth circular loop adapted to fit over the fourth bolt.

12. In a bicycle having a seat adapted to receive buttocks of a bicycle rider, the improvement comprising an anatomically correct bicycle seat being mounted on the bicycle, the anatomically correct bicycle seat further comprising:

a platform to receive buttocks of a bicycle rider cooperating with support mechanism in order to permit the anatomically correct seat to be mounted on the bicycle;

the platform including a U-shaped member;

the U-shaped member having incorporated therein an open design adapted to relieve pressure;

the U-shaped member having a front edge and a rear outward arc;

an inward arc being situated in the front edge;

at the platform including a top surface and a bottom surface;

the support mechanism being mounted on the bottom surface;

the top surface being adapted to receive the buttocks;

a pair of protrusions being adapted to assist positioning of the buttocks of a bicycle rider, while minimizing undesired pressure on nerves or blood vessels;

the support mechanism including a rod assembly and a spring assembly;

the rod assembly cooperating with the spring assembly;

the support mechanism including a bolt assembly;

the bolt assembly being adapted to support the spring assembly;

the spring assembly being adapted to support the rod assembly;

the rod assembly being supported on the spring assembly;

the rod assembly being adapted to mount the anatomically correct bicycle seat on the bicycle;

the bolt assembly including a first bolt, a second bolt, a third bolt and a fourth bolt;

the first bolt, the second bolt, the third bolt and the fourth bolt combining to form the vertices of an isosceles trapezoid;

the first bolt receiving a first spring;

the second bolt receiving a second spring;

the third bolt receiving a third spring;

the fourth bolt receiving a fourth spring;

the first spring, the second spring, the third spring and the fourth spring combining to receive the rod assembly;

the rod assembly including a one piece metal rod;

the first bolt and the second bolt forming a longer base of the isosceles trapezoid;

the third bolt and the fourth bolt forming a shorter base of the isosceles trapezoid;

the one piece metal rod extending from the first spring to the third spring to the fourth spring to the second spring;

the first bolt and the second bolt being adjacent to the front edge;

the third bolt and the fourth bolt being adjacent to the rear outward arc;

the one piece metal rod having a first arcuate loop adapted to fit over the first bolt;

the one piece metal rod having a second arcuate loop adapted for securing to the second spring;

the one piece metal rod having a third circular loop adapted for securing to the third spring; and the one piece metal rod having a fourth circular loop adapted for securing to the forth spring.

* * * * *